United States Patent [19]
Hammarlund et al.
[11] 3,883,790
[45] May 13, 1975

[54] DIRECT CURRENT POWER TRANSMISSION

[75] Inventors: Bertil Hammarlund; Lars-Erik Juhlin, both of Ludvika, Sweden
[73] Assignee: Allmanna Svenska Elektriska Aktiebolaget, Vasteras, Sweden

[22] Filed: Feb. 8, 1974
[21] Appl. No.: 440,873

[30] Foreign Application Priority Data
Feb. 14, 1973 Sweden .................................. 02049

[52] U.S. Cl. .......................................... 321/2; 321/14
[51] Int. Cl. .............................................. H02j 3/36
[58] Field of Search ........................ 321/2, 4, 14, 8 R

[56] References Cited
UNITED STATES PATENTS
3,431,482 3/1969 Uhlmann ............................ 321/14

Primary Examiner—R. N. Envall, Jr.

[57] ABSTRACT

A power transmission for high voltage direct current includes a direct current line and converter stations connected to the direct current line, with alternating current networks each connected to one of the converter stations. Each converter station includes at least two converters connected in parallel and is provided with a current control system to set the total current of the station as well as the current in the individual converters in accordance with a current order. Each station is provided with an arrangement for sensing the current and/or voltage on the d.c. line, which is connected to the current control system of the station and which reduces the current order set in the station in response to sudden interference in current and/or voltage. The station operating as an inverter is provided with an arrangement responsive to the disappearance of the current in one of the inverters of the station to limit the internal direct voltage of the other inverter to approximately zero.

7 Claims, 3 Drawing Figures

DIRECT CURRENT POWER TRANSMISSION

BACKGROUND OF THE INVENTION

1. Field of the Invention

The present invention relates to a direct current power transmission for high voltage comprising a direct current line and converter stations connected thereto, each converter station being connected to an alternating current network and comprising at least two converters connected in parallel. Parallel-connection of converters is primarily to satisfy the desire for sufficiently high rated power.

2. The Prior Art

In a d.c. transmission a master current control delivers current orders to the converter stations in such a way that the current order on the rectifier side exceeds that on the inverter side by a certain amount, the so-called marginal current, to obtain stable operation of the plant. If the individual station comprises several converters connected in parallel, means must be provided in each station for distribution of the current so that the load is distributed uniformly over the converters.

If a break occurs in one converter of a station this usually causes interference in the transmission and the nature of this interference depends on whether the station in question is operating as rectifier or inverter.

If a converter in an inverter station drops out, according to the normal control principles the rectifier will continue to supply current as ordered while the remaining inverter must accept this current alone. This may result in overloading of the inverter. If it is a rectifier station in which a converter drops out, the converters of the inverter station will decrease their phase angle and thus also their internal direct voltage in order to fulfil the requirements of the current order. In order to limit the direct current to that set for one rectifier, the remaining rectifier will reduce its internal direct voltage by increasing its phase angle and the result is that the direct voltage and even the direct current of the transmission will fall to zero.

Under normal circumstances such consequences are avoided by supplying the master current control with signals by tele-communication, for instance signals concerning the state of the converters so that when one converter in a station is cut out the superior current order can be reduced to that permissible for the remaining converter (s).

However, if there happens to be a fault in said tele-communications, such interference in the superior control is not possible and the present invention relates to measures to determine what has happened in such a case without tele-communications in each station, and act accordingly.

As mentioned, the cut-out of one converter in a rectifier station results in the inverter station reducing its phase angle and thus also its internal direct voltage in order to increase the total current of the station and in the remaining rectifier defending itself against overloading by reducing its direct voltage. The result is that voltage and current in the transmission line drop to zero.

SUMMARY OF THE INVENTION

According to the invention it is now proposed to sense this disappearance of voltage and current in the inverter station and to give a signal to reduce the current order for the whole station to an amount corresponding to the current order for one converter, that is, the current order for the remaining rectifier minus the marginal current.

The cut-out of a converter in the inverter station is not discovered as a matter of course by the rectifier station and it is therefore proposed according to the invention that this cut-out should cause the remaining inverter to reduce its internal direct voltage to zero, for example by reducing the phase angle to about 90° so that its internal direct voltage drops to about zero. This causes an increase in the direct current and the rectifier station therefore reduces its direct voltage correspondingly, that is, also to about zero. Thus the same indication is obtained in the rectifier station as in the inverter station, and the measures are the same, namely reduction of the current order in the fault-free station to a value permissible for the remaining converter in the other station.

The voltage drop, or rather the voltage cut-out, resulting from a drop-out of one converter in a station, and which, according to the invention, is used to reduce the current order so that the transmission can be kept at least partially running, cannot easily be distinguished from a voltage cut-out caused by other interference. This applies especially to line faults on the d.c. line and interference in the a.c. networks connected to the converter stations. Such voltage cut-outs will therefore be taken to be line faults by the line protection means of the stations. The measures according to the invention therefore are combined with the line protection menas of the stations so that the real fault is diagnosed by a cooperation between these different protection means.

BRIEF DESCRIPTION OF THE DRAWINGS

The direct current power transmission with protection means according to the invention is thus constructed in accordance with the accompanying drawings in which:

FIG. 1 shows a basic circuit diagram for a d.c. transmission while

DESCRIPTION OF THE PREFERRED EMBODIMENTS

Figure 1:
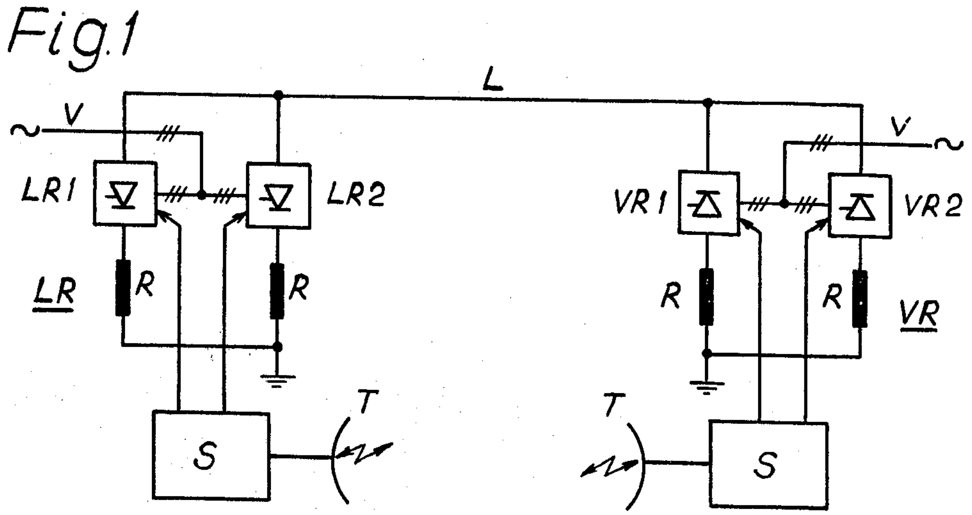

FIG. 1 shows a d.c. power transmission comprising two converter stations, one recifier station LR and one inverter station VR. Each station comprises two parallel-connected converters LR1 and LR2 and VR1 and VR2, respectively. The d.c. sides of the stations are connected by means of a d.c. line L and each station is connected to its own a.c. network V. Furthermore, one pole of each station is connected to earth through individual reactors R for the converters. Each station is provided with a current control system S and these two control systems are connected over a tele-communication line indicated by the antennae T in the control systems.

Figure 2:
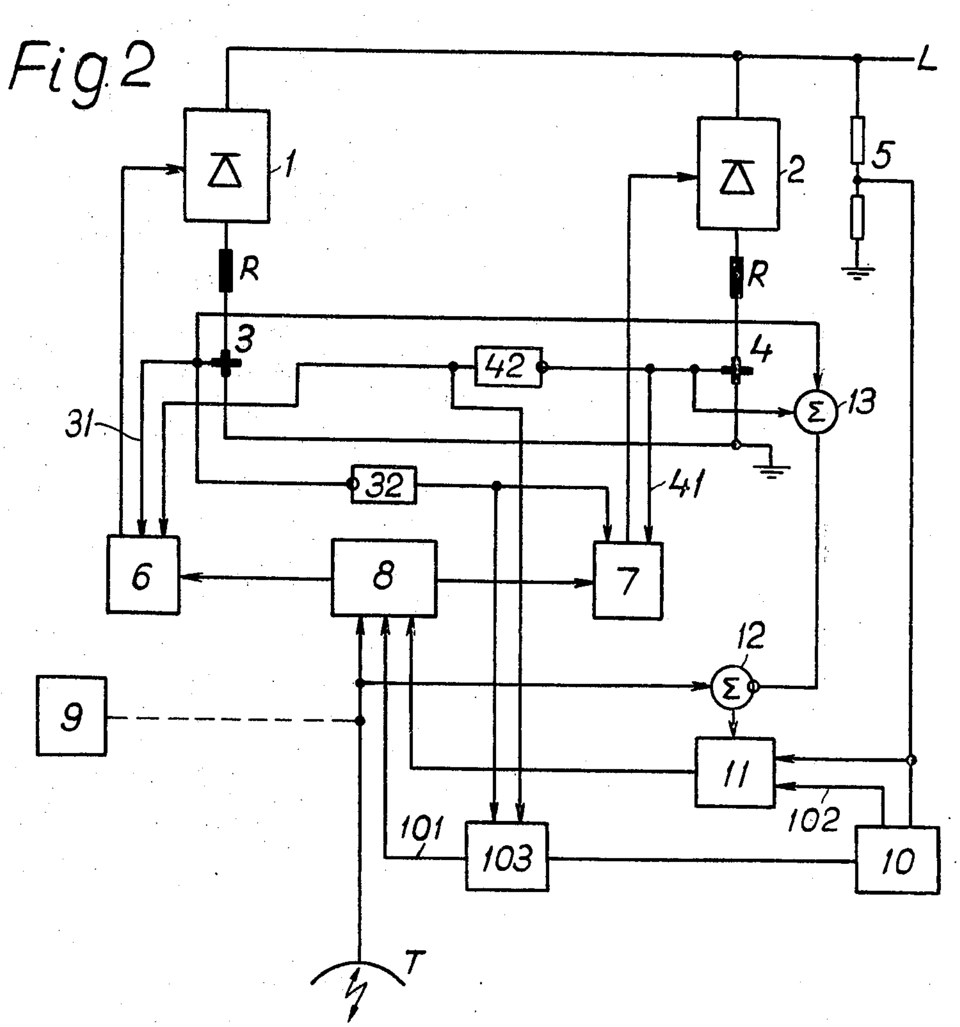
FIG. 2 shows a converter station for such transmission with a control system according to the invention and FIG. 3 shows details of the equipment.

FIG. 2 shows in more detail how a converter station according to FIG. 1 is constructed. FIG. 2 applies to both rectifier and inverter stations according to FIG. 1 since it is usual for these stations to be able to exchange operations if the power is reversed. Thus the function of certain parts is dependent on whether the station is operating as an inverter or a rectifier, as will be clear from the following.

As mentioned, the station comprises two converters 1 and 2 connected in parallel to the d.c. line L and in series with individual reactors R. A master control system 9 is provided for the entire transmission system and this delivers a current order to both the stations depending on the demand for transmitted power or some other transmission parameter. This master control system may be located in one of the stations, as indicated by the dotted connection line, or it may be located somewhere else entirely. At least one of the stations must therefore receive its current order over the tele-communication line, symbolized by the antennae T.

The current order from 9 is supplied to a receiver 8 which in the inverter includes a means for subtracting a certain magnitude corresponding to the marginal current from the current order. The current order and marginal current are generally indicated as electrical magnitudes of the same type and the marginal current is usually indicated as a constant magnitude which is connected by a connecting member into the inverter station while the marginal current is disconnected in the station operating as rectifier.

The receiver 8 distributes the current order received, possibly after subtraction of the marginal current, to the current regulators 6 and 7 for the converters 1 and 2, which then suitably receive current orders of equal size, equivalent to half the total order to the station. These current regulators are also supplied with the value of the currents in question in the relevant converter, through a first input 31, 41, respectively, from current meters, for example transducers 3 and 4, respectively. The control circuits 6 and 7 thus control the converters 1 and 2, for example in accordance with U.S. Pat. No. 3,551,778. So that the transmission may continue even if the tele-communication line drops out, the current order should preferably be given so that it is stored in the receivers 8 in the two stations and is only altered upon an order from the master control system 9. The transmission can be controlled, for example, as in any of the examples in U.S. Pat. Nos. 2,832,029 or No. 2,866,148.

Each staion is also provided with a line protection device 10 connected to a voltage divider 5 to sense the line voltage. Such a line protection device may be constructed in accordance with U.S. Pat. No. 3,036,257 so that it senses the voltage drop on the line which the current control of the converters effects as a result of a line fault, whereupon the current control 6 – 8 of the converters is reduced to zero current over the connection 101 from the line protection device. The line protection device may also be provided with means for reconnection in accordance with U.S. Pat. No. 3,331,990 or U.S. Pat. No. 3,417,291, involving a certain number of re-connection attempts and thereafter a signal for special measures. Such a signal can be taken out over a special output 102 from the line protection device, which will be explained later.

As mentioned, the invention is intended to ensure operation of the transmission if the tele-communication line cuts out, even if interference in the form of a drop-out of one converter in a station occurs meanwhile.

If one of the converters 1 or 2 in the rectifier staion cuts out, the other converter will continue operation in accordance with its own current order, that is with half the current set for the transmission. The two converters of the inverter station thus both receive only half current. As a result, current control decreases the internal direct voltage of the inverters and this continues until the lowest phase angle limit in the inverters, usually set at about 90°, and thus substantially zero voltage on line L, has been reached.

This low line voltage is sensed by a voltage-sensitive member 11, to the input side of which is also connected a summator 12 which indicates the difference between the total current order of the station from 9 to 8 and the actual current. The latter is measured by a summator 13 connector to the transducers 3 and 4. Since the member 11 senses that the line voltage is low and that there is considerable deviation between the desired and the actual current in the inverter station, it is clear that the rectifier station cannot produce what the inverter station is set for and the member 11 in the inverter station therefore gives a signal to the receiver 8 to reduce the current order in this station to half.

The line protection device 10 in both stations will also react because of the low line voltage. This is of no great importance in the inverter station where the intervention of the line protection device is unimportant. An intervention from the line protection device in the rectifier station where an indication has already been received as to the nature of the fault is unnecessarily disturbing with repeated connection and disconnection.

For this reason the transducers 3 and 4 may be provided with an extra output 32, 42, respectively, giving a signal when the current in the corresponding converter becomes zero and thus indicating that this converter has dropped out. With the help of such a signal, a connecting device 103 in the connection 101 is temporarily blocked so that the line protection device 10 in the rectifier station is disconnected for as long as the inverter station needs to alter its current order.

Instead of connecting members 32 and 42 to the transducers 3 and 4, it may be more convenient to connect them in some other way, for example to the control circuits 6 and 7, to indicate the cut-out of a converter.

If one converter in an inverter station drops out, the total current from the rectifier station will be forced onto the other inverter, and if this current exceeds that premitted the remaining inverter will be overloaded. However, nothing will be noticed in the rectifier station as long as the inverter functions.

In order to be able to signal between the stations in spite of faulty tele-communications, therefore, the signal from the indicator member 32 or 42 for the inverter which has cut out is permitted to activate the current regulator 7 or 6, respectively, of the remaining inverter with a signal which temporarily reduces the internal voltage of the inverter to around zero. In a control system according to U.S. Pat. No. 3,551,778 mentioned above, this reduction in voltage can be made by reducing the value of $\alpha_{max}$ to 90° in the device for limiting the phase angle $\alpha$ to $\alpha_{max}$. Another possibility is to permit the signal 32 or 42 to give a strong increase of the current order in 7 or 6, respectively. In both cases the result will be a rapid disappearance of the voltage on the d.c. line L which is sensed by the voltage-sensitive member 11 in the rectifier station.

In the rectifier station, however, no current error signal is obtained from 12 as was the case in the fault-free inverter station described above. However, the line protection device 10 will react and in this case the member 11 is suitably coordinated with the line protection device through the conncetion 102. This means, therefore, that the line protection device must first perform a number of disconnections and connections before sending a signal to 11 which will then reduce the current order in the receiver 8 to the value permitted for one converter. If, therefore, 10 and 11 have guessed correctly, that is that the voltage cut-out was due to an inverter cutting out, the transmission will continue to operate with reduced power.

There is good reason to allow the line protection device to react as if a line fault had occurred since the likelihood of a line fault occurring far outweighs the likelihood of a converter cutting out.

It should also be pointed out that the temporary voltage reduction in a remaining inverter is only necessary if the total current order for the transmission exceeds that permissible for one converter. The activation of a regulator 6 or 7 from 42 or 32, respectively, can therefore suitably be made current-dependent.

Disturbance due to a rectifier dropping out can also be limited if an indication of drop-out is obtained from the tele-communication line, whereupon the marginal current in the inverter station increases. If, therefore, the marginal current is increased to approximately half the total current order, the current order of the inverter station upon drop-out of a rectifier will be less than the current supplied from the remaining rectifier and no further action is necessary. There is thus no decrease in the line voltage from the inverter side and neither 11 nor 12 will react.

Figure 3:
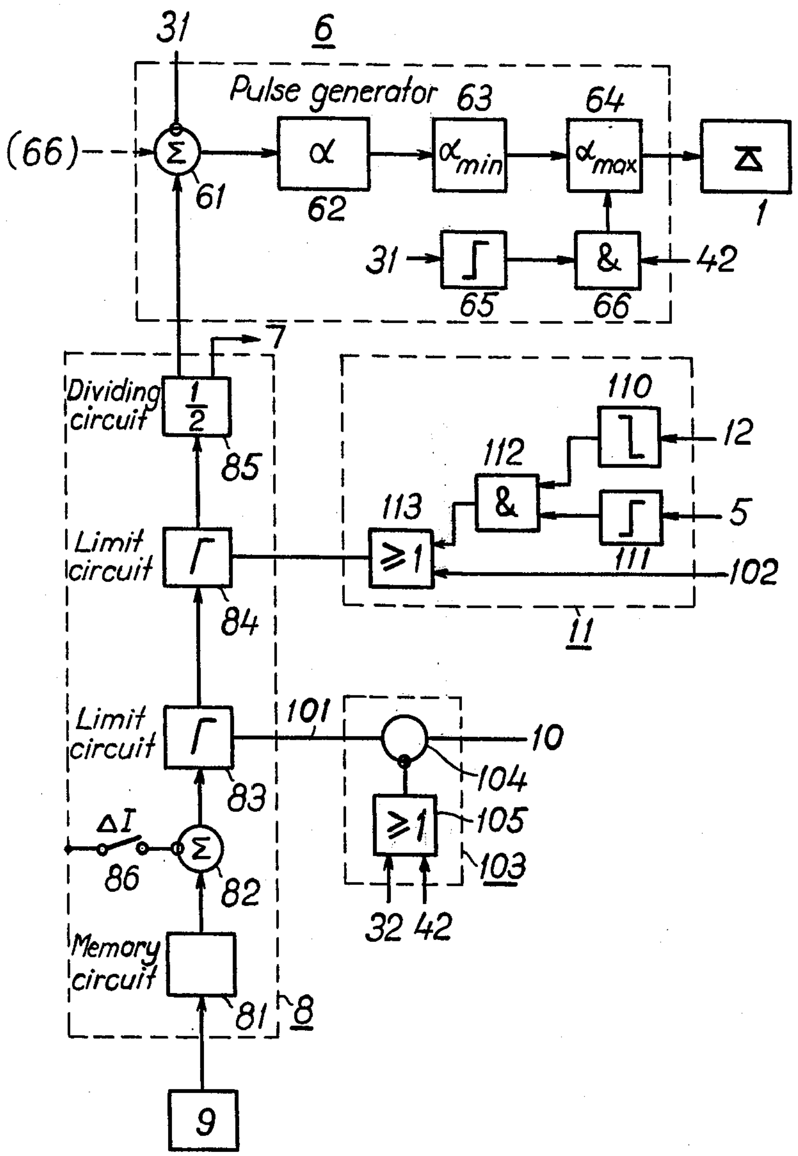

In FIG. 3 the components 6, 8, 11 and 103 and their connections are shown in more detail. Current regulator 7 is made in the same way as 6.

The receiver 8 comprises a memory circuit 81 connected to the master control system 9. In 81 the current order is stored and amendments of this order are made by increasing or decreasing order signals from 9. On the output of 81 there is inserted a summary means 82 for subtraction of the current margin Δ I from the current order stored in 81. The signal for Δ I is connected to 82 over a switch 86, which is closed in the inverter station while it is open in the rectifier station.

After 82 there is a limiting circuit 83 influenced from the line protection device 10 so that the current order is reduced to zero in case of a line fault. As mentioned earlier the protection device normally operates with a number of disconnection and reconnection orders, that is a sequence of reductions of the current order. In order to disconnect the line protection device 10 in the rectifier station in case of a converter fault, 10 is connected to 83 over the connecting device 103. This comprises a switch 104 with a negative input connected to an OR-gate 105 connected to 32 and 42 in FIG. 2. Thus is one of the converters 1 or 2 in FIG. 2 becomes currentless, the corresponding member 32 or 42, respectively, will block the switch 104.

In series with the limiting circuit 83 there is another limiting circuit 84 influenced from the member 11. This member has three inputs connected to 12, 5 and 10 (over 102). The member 11 has an OR-gate 113 with two inputs, one of which is connected to 102 while the other is connected to an AND-gate 112 with two inputs, connected to 5 and 12 over discriminators 111 and 110, respectively. The upper input of 113 is provided for inverter operation while the lower is provided for rectifier operation as seen from the following.

If one of the converters in the rectifier station becomes faulty the line voltage and line current will decrease to very low values as earlier described. In the inverter station summation member 12 will thus give a great difference signal which is detected by discriminator 110, which gives a signal to 112. The low voltage over voltage divider 5 is detected by discriminator 111, which also gives a signal to 112. Thus 112 gives a signal over 113 to 84, which limits the current order in the inverter station with its two faultless converters to a lower value, preferably to the allowable current value for one converter, so that the faultless converter of the rectifier station will be able to maintain the transmission.

The other input 102 of 113 is described below.

After the circuit 84 there is a dividing circuit 85 for dividing and distributing the current orders to the current regulators 6 and 7 which are similar to each other.

Regulator 6 comprises a summary means 61 for subtraction of the current order from 85 from the actual current value of converter 1 obtained from 3 over input 31. The difference signal influences the pulse generator 62, which gives pulses to converter 1 with a phase angle $\alpha$ determined by the signal from 61. The phase angle $\alpha$ is limited by limit means 63 and 64 for $\alpha_{min}$ and $\alpha_{max}$, as shown in U.S. Pat. No. 3,551,778. Current regulator 6 for converter 1 is also influenced from the member 42 of converter 2 and vice versa, which could be made over limit means 64. Thus 42 is connected to 64 over an AND-gate 66 with another input connected to 31 over a discriminator 65.

If in the inverter station for instance converter 2 becomes faulty and currentless, 42 will give a signal to 66. The current of converter 1 increases as this converter has to receive the whole current from the rectifier station and if this current exceeds the value allowable for one converter, the discriminator 65 also gives a signal to 66 which thus gives a signal to 64, limiting the value of $\alpha_{max}$ to about 90°. The result is a low direct voltage in the inverter station, giving a current surge in the line and in the rectifier station. Here the line protection device 10 first gives a number of signals over 103 and 101 to 83 and thereafter over 102 and 113 to 84, so that the current order in 84 in the rectifier station with its two faultless converters is limited to the value allowable for one converter.

Instead of connecting 66 to 64 it could be connected to 61 as indicated by a dotted line, giving a current increasing signal to 61.

Depending on the setting of the limit means 83 and 84 it may be convenient to insert margin device 82, 86 between 84 and 85.

Other means conventional for a transmission with parallel connection of converters and necessary for the reliable operation of such a transmission, but with no direct connection with the idea of the invention, are omitted in the drawings for the sake of simplicity.

We claim:

1. Power transmission for high voltage direct current comprising a direct current line (L) and convertor stations (LR, VR) connected thereto, each convertor station including a current control system, at least one station being a rectifier station and at least one station being an inverter station, the convertors in the inverter station being inverters, the convertors in the rectifier station being rectifiers, alternating current networks (V) at least one connected to each of said convertor stations, each convertor station comprising at least two convertors (1, 2) connected in parallel, each control system (6–8) including means to set the total current of the station as well as the current in the individual convertors in agreement with a predetermined current order (9), a telecommunication means (T) between said convertor stations for coordinating the total current of the stations, means for replacing said telecommunication line in case of a fault in it, said means comprising in each convertor station a means (11) to sense at least one of the magnitudes current or voltage on the d.c. line, means connected to said sensing means and to the current control system (8) of the station to reduce the current order set in the station in response to a sudden interference in at least one of the magnitudes current or voltage, and, in the inverter station, means (32, 42) responsive to current disappearance in one of the inverters of the station to reduce temporarily the internal direct voltage of the other inverter to approximately zero.

2. Power transmission according to claim 1, having in the rectifier station a line protection device (10) which includes means responsive to the cutting-out of one of the rectifiers in the station to disconnect said line protection device in the rectifier station (LR) for as long as the inverter station (VR) takes to alter its current order.

3. Power transmission according to claim 1, having in the rectifier station a line protection device (10) which includes means to perform a number of attempts at disconnection and connection in response to indication of a line fault, in which said current order reducing means of the rectifier station are responsive only after a number of attempts at disconnection and connection by the line protection device to reduce the current order of the current control system (8) of the rectifier station.

4. Power transmission according to claim 2, in which in the inverter station (VT), said means (32, 42) for temporarily reducing the voltage of an inverter which is not faulty to around zero is responsive to an excess of only the total current of the station over the current permissible for any remaining inverter.

5. Power transmission according to claim 4, in which the tele-communication means comprises a telecommunication line between the current systems of the stations, and means responsive to the cutting-out of said tele-communication line to increase the marginal current set in the inverter station.

6. Power transmission according to claim 1, including means responsive to the cutting-out of a rectifier in the rectifier station to increase the current order of the remaining rectifier to the current permitted for such remaining rectifier.

7. Power transmission according to claim 1, including means to reduce said current order to the maximum permissible for any remaining converter.

* * * * *